(12) United States Patent
Kersey et al.

(10) Patent No.: US 7,480,794 B2
(45) Date of Patent: Jan. 20, 2009

(54) SYSTEM AND METHODS FOR TRANSPARENT ENCRYPTION

(75) Inventors: Edward C. Kersey, Alpharetta, GA (US); Derek L. Huckaby, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 721 days.

(21) Appl. No.: 10/947,183

(22) Filed: Sep. 22, 2004

(65) Prior Publication Data

US 2006/0064750 A1 Mar. 23, 2006

(51) Int. Cl.
*H04L 9/00* (2006.01)
(52) U.S. Cl. .................. 713/153; 713/162; 370/351; 709/238
(58) Field of Classification Search .......... 713/153
See application file for complete search history.

(56) References Cited

U.S. PATENT DOCUMENTS

| 6,732,269 B1 * | 5/2004 | Baskey et al. ........... 713/153 |
| 2003/0185219 A1 * | 10/2003 | Maynard .......... 370/395.32 |
| 2005/0050362 A1 * | 3/2005 | Peles ..................... 713/201 |

\* cited by examiner

*Primary Examiner*—Emmanuel L Moise
*Assistant Examiner*—Shewaye Gelagay (57) ABSTRACT

Conventional SSL termination devices support secure connections only to a predetermined destination address. An SSL termination device accepts a plaintext connection and associate it to a secure connection to an arbitrary destination endpoint by intercepting a connection request from the local subnetwork, identifying the intended destination of the connection, and establishing a secure connection to the destination, bridges the local connection and the secure connection to provide a connection through the gateway device. The SSL termination device identifies an outgoing secure connection request from a client, and intercepts the connection request to identify the recipient destination. The SSL termination device establishes a secure connection using the identified destination, and associates the connections by mapping the intercepted connection to the recipient. The identified recipient allows the secure connection to the destination, and the mapping allows message traffic received from the client over the local connection to be mapped to the destination.

8 Claims, 7 Drawing Sheets

SYSTEM AND METHODS FOR TRANSPARENT ENCRYPTION

BACKGROUND

Computer networks often employ encryption techniques for security against unwanted dissemination of information and malicious interception or corruption of data transported thereby. Encryption involves performing a predetermined mathematical computation on the data to render it unintelligible prior to transmission, yielding a so-called ciphertext form, and performing an inverse computation at a receiving end to recover the original data in a so-called plaintext form. Therefore, encryption typically imposes a handshaking or setup exchange to identify the encryption and corresponding inverse (decryption) functions and/or operations. One typical encryption setup is a public key exchange, as is known to those of skill in the art.

Conventional protocols embed provisions for such encrypted exchanges into the protocol. For example, the TCP/IP protocol employs a secure socket layer (SSL) adapted to support encrypted transmissions. Typical TCP/IP transmissions employ a system of well known ports for identifying types of data traffic transported. Such well known ports identify common types of traffic to facilitate interpretation by sending and receiving entities, and are described in IETF RFC 1700, "Assigned Numbers"). For example, a conventional web page request, employing the Hypertext Transfer Protocol (HTTP), employs port 80. Conversely, as indicated above, an encrypted web page request using SSL mechanisms employs a Secure Hypertext Transfer Protocol (HTTPS), utilizing well-known port 443.

Sending and receiving entities exchanging encrypted message traffic must nonetheless participate in a setup exchange to coordinate usage of conventional encryption parameters. However, many users are unfamiliar or uninterested with the conventional setup and exchange procedures, as such so-called key exchanges tend to be technically robust. Further, performance and staleness issues tend to complicate the exchange by imposing timely updates and/or regeneration of key variables, and burdening transmission performance with the increased processing required for greater security. In general, the seamlessness or transparency of the encryption mechanism tends to be inversely proportional to the degree of security thereby provided.

SUMMARY

Conventional security measures employ technology such as public key encryption for message traffic between users. Such conventional security measures require an exchange of security parameters between recipients, and often involve a third party such as a certificate authority (CA). Since the conventional security mechanisms tend to impose administrative overhead and impact performance, some users may be reluctant or unwilling to employ such conventional mechanisms.

Further, conventional networks often take the form of subnetworks, such as LANs or intranets, which represent clusters of co-located users (i.e. an office location) coupled via a trunk or backbone to other subnetworks. Frequently, the security requirements within such a conventional subnetwork are not as stringent as with the external network (i.e. Internet). Accordingly, conventional measures deploy a gateway device at an ingress or egress point from a trusted subnetwork of LAN. Such a gateway may, for example, denote a VPN or edge of the LAN or intranet. At such a conventional gateway, one approach employs an SSL termination device for handling external secure connections. Therefore, internal communications within the subnetwork (i.e. within the same building or location) need not incur the security overhead encountered with communications beyond the Internet gateway.

However, for SSL termination devices extending beyond the trusted subnet, it has become desirable to operate in the so-called "reverse" direction, i.e. outgoing from the "local" intranet to a remote Internet node. The original direction upon inception of such conventional SSL termination devices was for the SSL termination device to accept an HTTPS connection and convert it to an HTTP connection. The next progression is marked by a need for the connection to remain as an HTTPS connection all the way to the actual server. Accordingly, conventional SSL devices were adapted to accept the HTTPS connection, load balance the connection based on information in the clear text of the data it was decoding, then send the connection HTTPS to the intended server.

Subsequent user developments triggered a need for all traffic to be HTTPS, such that SSL devices be enabled to accept an HTTP connection and convert it to an HTTPS connection. However, conventional devices typically require knowing the true connection endpoint identity for such capability. For example, the conventional SSL termination device may be configured to accept a connection to a pre-determined IP address, corresponding to the HTTP connection. Upon receipt of the HTTP connection identification, the SSL termination device may send the HTTPS connection to the IP address specified in the configuration. A potential drawback with this conventional approach is the SSL termination device is to be configured for all destination endpoints, which may not be known to the system administrator.

Therefore, configurations discussed below substantially overcome the drawbacks associated with conventional SSL termination devices by recognizing that certain communications benefit from or rely on end-to-end encrypted connections from an originator to a destination. In typical conventional networks, an intervening gateway may obscure the endpoint to endpoint key exchange. For example, in conventional SSL termination devices, the gateway converts incoming secure (HTTPS) message traffic to unsecure clear text (HTTP) message traffic. However, the reverse connection is impeded because the recipient destination is needed to establish the secure connection, and is unavailable because the gateway device terminates the outgoing connection in favor of a new HTTPS connection. Since the gateway initiates a new connection to a remote server, and terminates (i.e. acts as an endpoint) for the local connection from the client, a secure connection cannot be initiated because the gateway does not have access to the recipient destination information. One conventional alternative is to enumerate and configure all possible remote destinations to the gateway, but in practice such a mechanism is feasible only for a small number of possible remote destination endpoints.

Therefore, particular configurations of the SSL termination device discussed further below need not be configured with the destination IP address or other identity of the recipient endpoint of an HTTP connection. Instead, the SSL termination device is configured on either a global or TCP/IP port basis on the HTTP side of the connection to "analyze" (i.e. by sniffing or parsing, for example) the URL or other identifier available in the HTTP header. Typically, such an identifier enables discovery of the actual hostname of the end system to which the connection is intended. The device configured as disclosed below may perform a DNS lookup on the hostname and employs the IP address obtained from the lookup to forward the HTTPS connection to the obtained address.

Accordingly, configurations of the invention are based, in part, on the observation that a gateway device, such as a conventional SSL termination device, cannot generate outgoing secure connections without knowing the true identity of the destination recipient of the connection to generate an end-to-end connection between the SSL terminator and the destination. In other words, conventional SSL termination devices can only support secure connections to a predetermined destination address. It would be beneficial to provide an SSL termination device operable to accept a conventional plaintext (HTTP) connection and convert the connection, via proxy or similar virtual association, to a secure (HTTPS) connection to an arbitrary destination endpoint. Accordingly, configurations of the invention intercept a connection request from the local subnetwork (LAN, VPN, intranet, etc.), identify the intended destination of the connection, and establish a secure HTTPS connection to the intended destination, effectively bridging the local connection and the secure connection to provide an end-to-end connection from a local client to the destination through the gateway device.

Configurations of the invention substantially overcome the above-described shortcomings of conventional SSL termination devices by identifying an outgoing secure connection request from a client, and intercepting the connection request to identify the recipient destination in the connection request. The SSL termination device establishes a secure connection using the identified destination, and associates the connections by mapping the intercepted connection request from the client with the secure connection from the SSL terminator to the recipient. The associated connections operate as a proxy link across the SSL termination device. The identified recipient information scanned from the connection request allows the secure connection to the destination, and the mapping allows corresponding message traffic received from the client over the local connection to be mapped to the associated secure connection to the destination. In this manner, configurations disclosed further below link, or associate, the connection from the client to the destination via the SSL terminator in the gateway device maintaining the mapping.

In further detail, the method for secure transport intercepts an outgoing connection attempt from a client (i.e. node on a subnet, VPN, intranet, etc.) and identifies a destination from the outgoing connection attempt. The SSL terminator establishes a secure connection using the identified destination from the connection attempt, and establishes the attempted outgoing connection by terminating the outgoing connection attempt, thereby completing the outgoing connection from the client at the SSL terminator. The mapper associates the terminated outgoing connection with the established secure connection continuing on to the destination, in which the association is operable to transfer message traffic intended for the destination over the secure connection in a continuous manner from the detected outgoing connection to the identified destination, using the mapping table to map successive packets and/or frames.

The SSL terminator detects the outgoing connection attempt, and scans the connection attempt for a destination identifier indicative of a remote intended recipient. Identifying the destination therefore includes scanning the connection attempt and extracting an identifier indicative of the intended destination, such as a destination IP address. The SSL terminator then terminates (i.e. completes) the outgoing connection attempt by accepting the outgoing connection attempt as a local connection by completing a connection exchange, and emulating the intended destination as an endpoint of the outgoing connection.

In the exemplary configuration discussed further below, successive communication over the established connections occurs by identifying data to be transmitted as message traffic via the outgoing connection, receiving the identified data, and redirecting the identified data via the established secure connection. The SSL terminator, therefore, maps data sent from a client, in which the data is intended for transmission via the outgoing connection, to the established secure connection. The SSL terminator therefore transports data between the client and a remote intended destination in a seamless manner via the mapped connection, in which the seamless manner includes receiving data over the established local connection, indexing the secure connection to the identified destination via the mapping, and forwarding the received data to the identified destination via the indexed secure connection.

In particular configurations, the established secure connection corresponds to a ciphersuite, and the SSL terminator is operable to identify a ciphersuite, corresponding to the identified destination, indicative of an encryption algorithm operable via the secure connection, and operable to apply the identified ciphersuite to the received data prior to redirecting. Therefore, the SSL terminator first determines if the outgoing connection is intended as a secure connection, and indexes a ciphersuite using the intended destination by indexing a repository of expected destinations. The identified ciphersuite may be, for example, indicative of stronger or weaker encryption algorithms based on the destination.

In particular configurations, the SSL terminator correlates the outgoing connection attempt and the established secure connection in a mapping table indicative of local and remote connection attempts, indexes the outgoing connection and the established secure connection to identify outgoing message data on the outgoing connection destined for the identified destination, and links the outgoing connection with the secure connection to forward message data to the destination via the secure connection.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In a computer network, certain groups of users, such as within a business or enterprise LAN, employ a gateway device such as a router or hub as an egress point to the Internet or other public access network. In such a network, communications within the enterprise LAN, or subnetwork, may enjoy less stringent security expectations than communications emanating from the LAN. Such installations may mandate certain security requirements for external connections. However, conventional users may tend to avoid security due to the overhead imposed by the additional processing and need to maintain current security parameters such as certificates and keys. For this reason, it may be beneficial for the gateway device to establish and coordinate secure connections, or links, as a continuation of unsecure, or plaintext, connections from within the enterprise subnetwork.

Often, a gateway device, such as a conventional SSL termination device, cannot generate outgoing secure connections without knowing the true identity of the destination recipient of the connection to generate an end-to-end connection between the SSL terminator and the destination. In other words, conventional SSL termination devices can only support secure connections to a predetermined destination address. It would be beneficial to provide an SSL termination device operable to accept a conventional plaintext (HTTP) connection and effectively convert it, such as via a proxy linking or other association, to a secure (HTTPS) connection to an arbitrary or dynamically specified destination endpoint. Accordingly, configurations of the invention intercept a connection request from the local subnetwork (LAN, VPN, intranet, etc.), identify the intended destination of the connection, and establish a secure HTTPS connection to the intended destination, effectively bridging the local connection and the secure connection to provide an end-to-end connection from the local client to the destination through the gateway device.

Configurations of the invention substantially overcome the above-described shortcomings of conventional SSL termination devices by identifying an outgoing secure connection request from a client, and intercepting the connection request to identify the recipient destination in the connection request. The SSL termination device establishes a secure connection using the identified destination, and associates the connections by mapping the intercepted connection request from the client with the secure connection to from the SSL terminator to the recipient. The identified recipient information scanned from the connection request allows the secure connection to the destination, and the mapping allows corresponding message traffic received from the client over the local connection to be mapped to the associated secure connection to the destination. In this manner, configurations of the invention, disclosed further below, associate the connection from the client to the destination via the SSL terminator in the gateway device maintaining the mapping.

Figure 1:
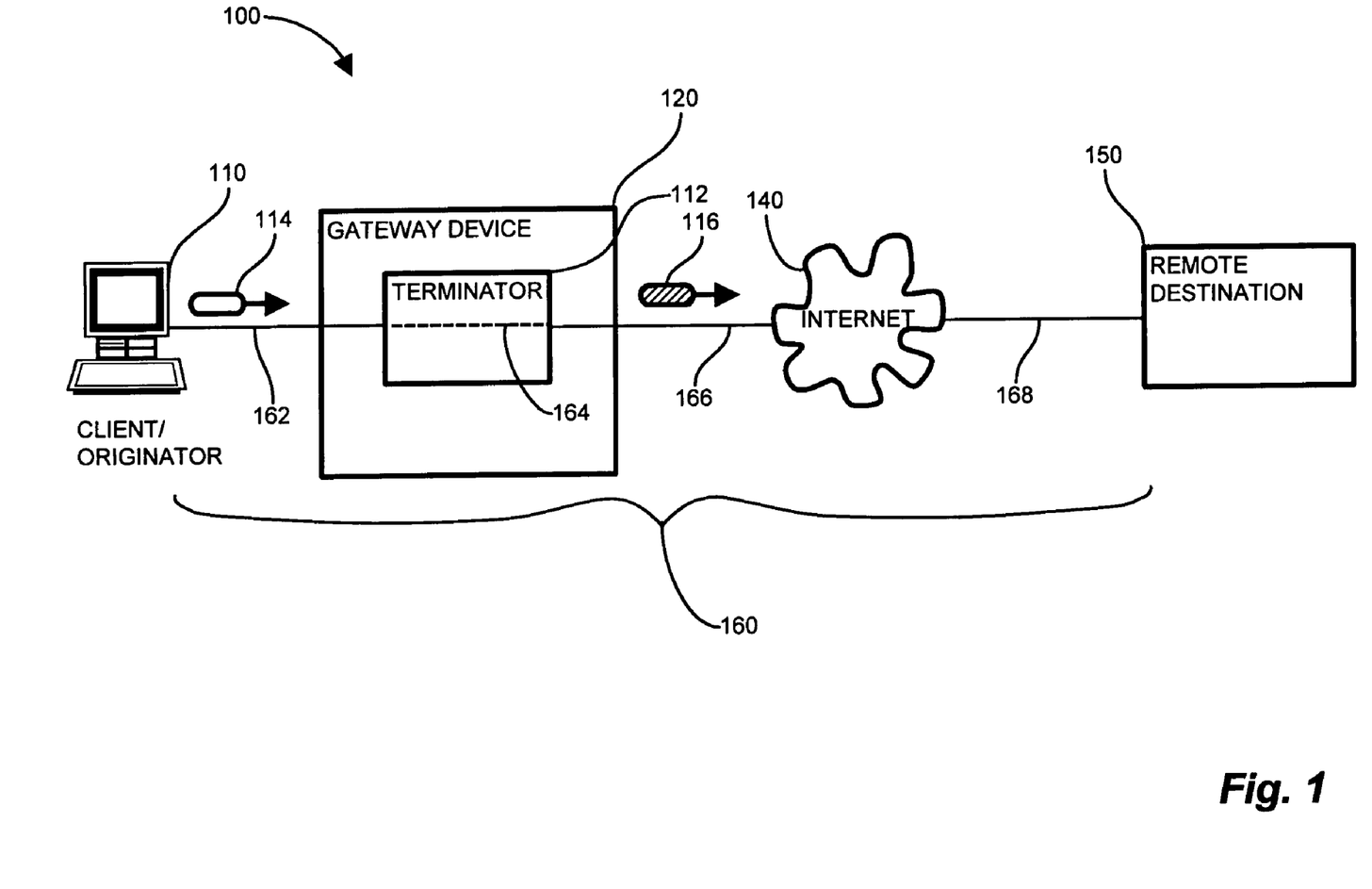
FIG. 1 is a context diagram of a network communications environment operable for use with the present invention.

FIG. 1 is a context diagram of a network communications environment operable for use with the present invention. Referring to FIG. 1, the environment 100 includes a gateway device 120 having a terminator 112 coupled between a client 110 and network such as the Internet 140. The Internet 140 or other common access network is operable to connect to a plurality of remote destinations 150, shown singularly for clarity. The terminator 120 is operable as a connection endpoint for connections 162 from the client 110, or connection originator, and also as an endpoint for a connection 166, 168 from the terminator to the remote destination 150 via the Internet 140. The gateway device 120, which is typically an access point to the subnetwork including the client 110, employs the terminator 112 as a proxy link 164, or association, between the connections 162 and 166 to provide a seamless secure connection 160, or link, from the client 110 to the remote destination 150. The terminator 112 receive a plaintext connection request 114, or message, and establishes an encrypted connection 166, 168 for transporting encrypted messages 116, effectively bridging the plaintext connection 162 and the ciphertext connection 166, shown by the proxy link (dotted line) 164, as will now be discussed in further detail below.

Figure 2:
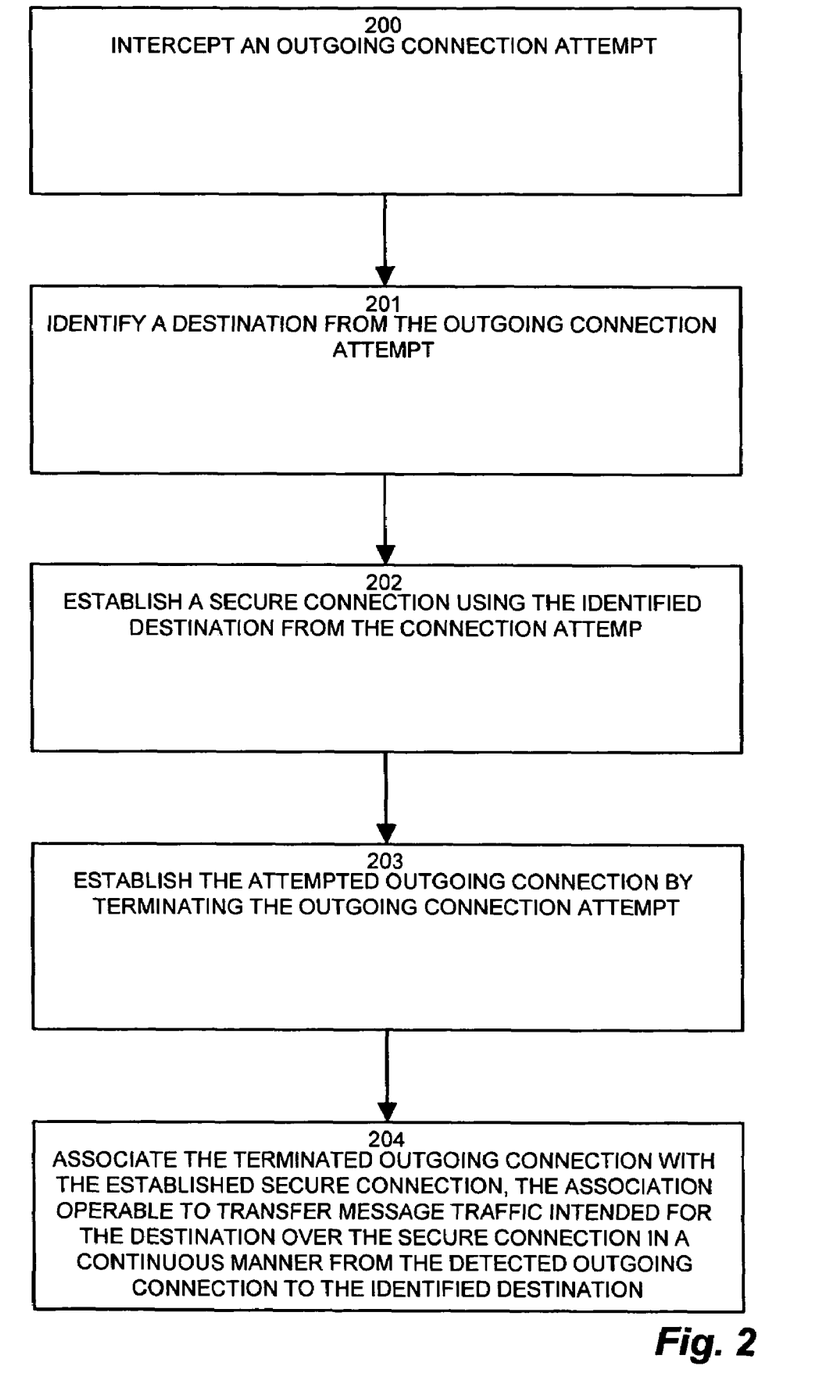
FIG. 2 is a flowchart of message traffic transport in the network of FIG. 1.

FIG. 2 is a flowchart of message traffic transport in the network of FIG. 1. Referring to FIGS. 1 and 2, the method for secure transport includes intercepting an outgoing connection attempt 114, as depicted at step 200, and identifying a destination from the outgoing connection attempt 114, as shown at step 201. The gateway device typically scans or parses the content of the connection attempt 114 to determine a destination IP address or other identifier indicative of the remote destination 150. Using the identified destination 150, the terminator 112 sends a secure connection attempt 116 to establish a secure connection 166, 168 using the identified destination 150 from the connection attempt 112, as depicted at step 202. The terminator then establishes the attempted outgoing connection 162 by terminating the outgoing connection attempt 114, i.e. designating the terminator 112 as the endpoint for the local connection 162 emanating from the client 110, as shown at step 203. The terminator 112 associates the terminated outgoing connection 162, or local connection with the established secure connection 166, 168 to the destination 150, in which the association is operable to transfer message traffic intended for the destination 150 over the secure connection 166, 168 in a continuous manner, shown by the proxy link 164, from the detected outgoing connection 162 to the identified destination 150, as shown at step 204, effectively forming a seamless connection 160.

Figure 3:
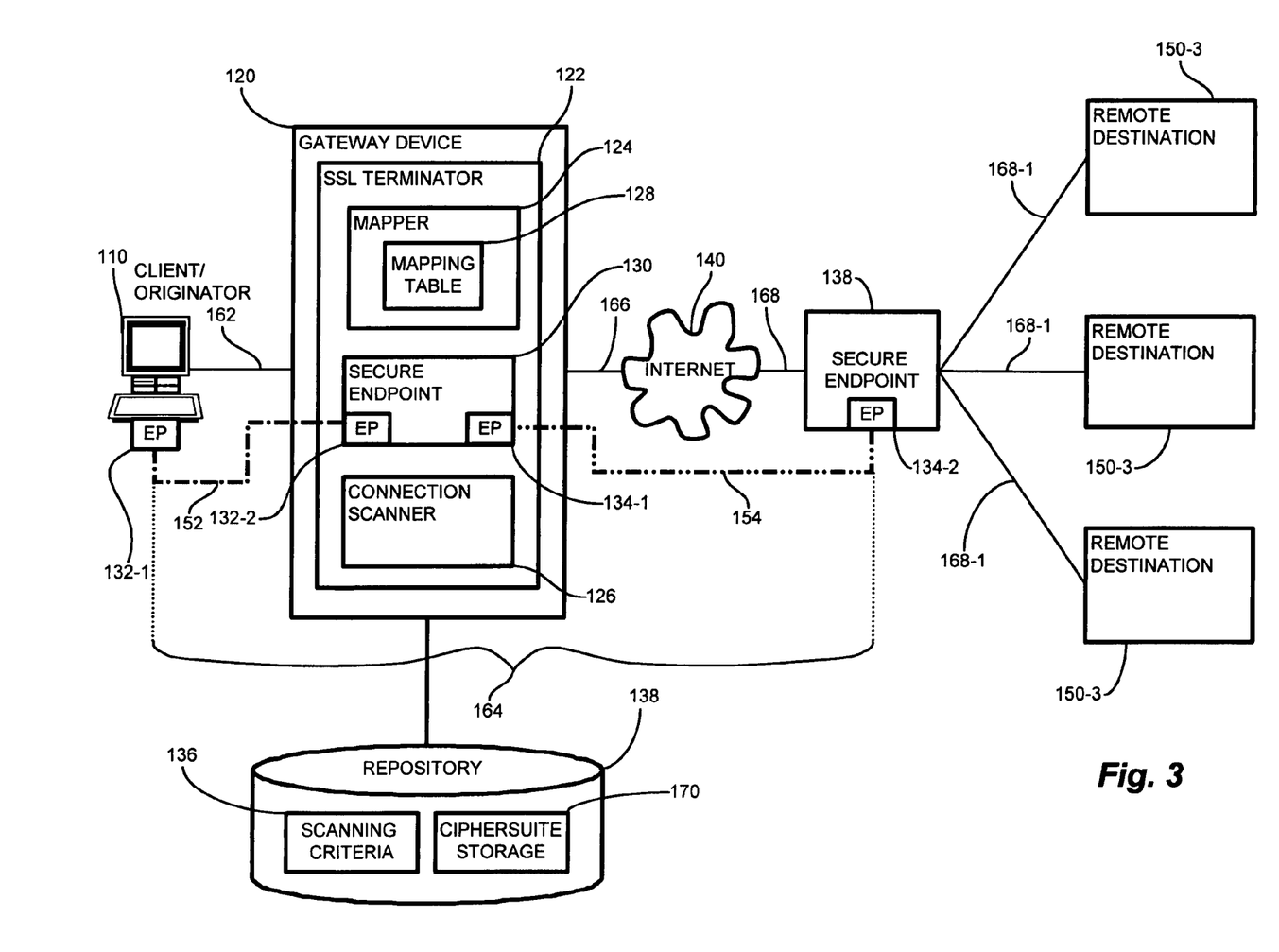
FIG. 3 is a block diagram of the gateway device including the terminator of FIG. 1 in greater detail.
Figure 4:
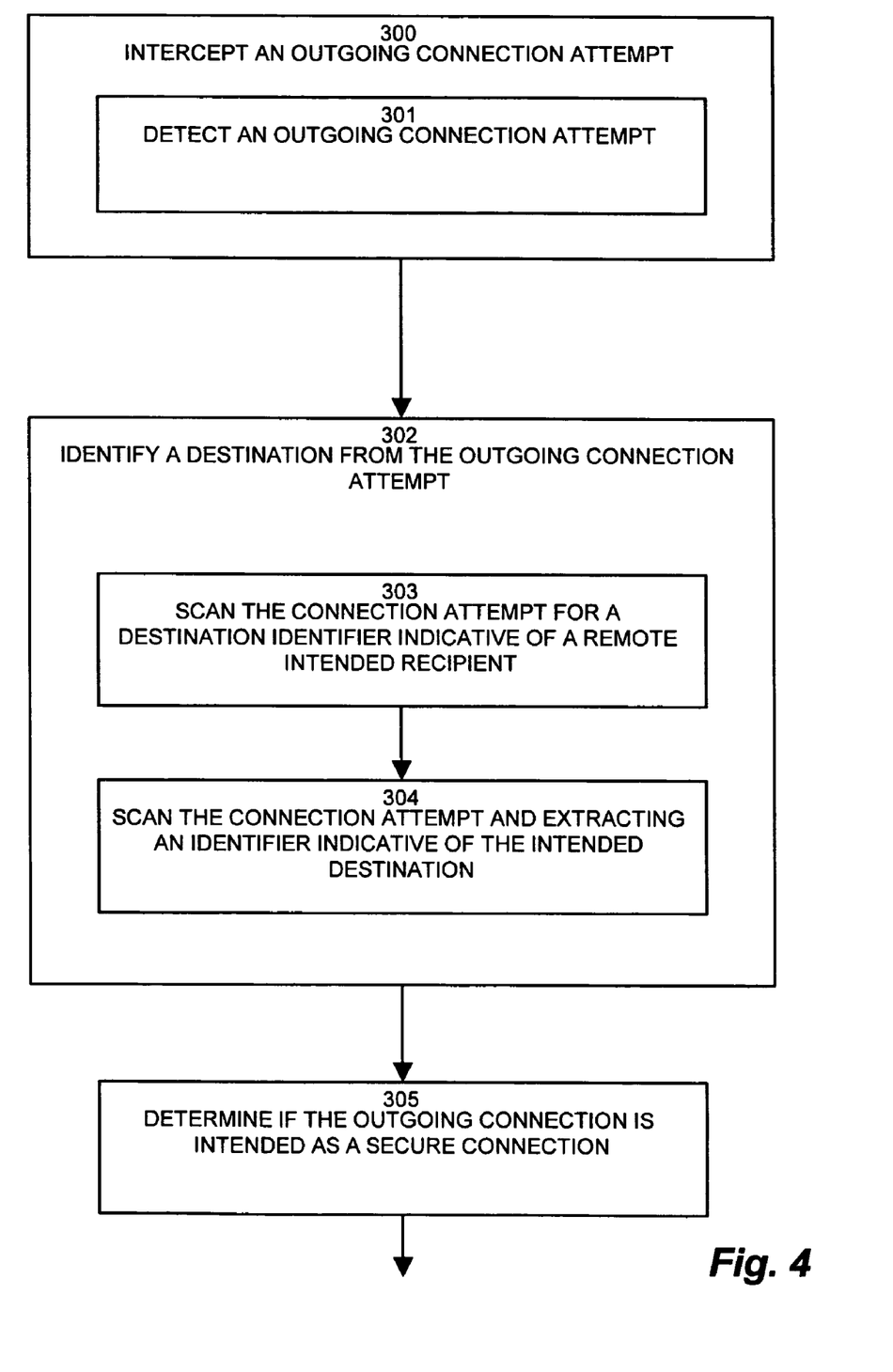
FIGS. 4-7 are a flowchart of transparent encryption as in FIG. 2 in greater detail.
Figure 5:
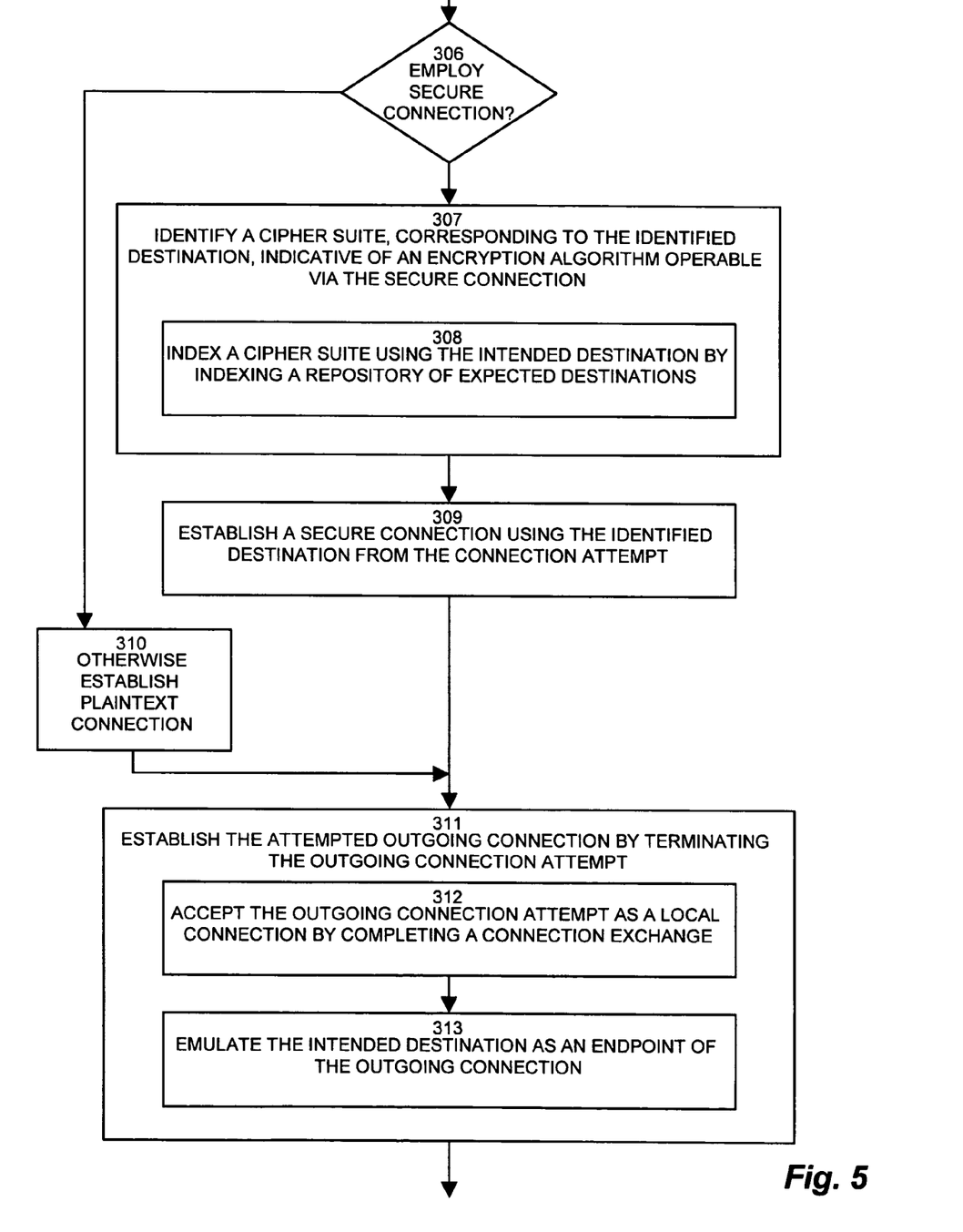
Figure 6:
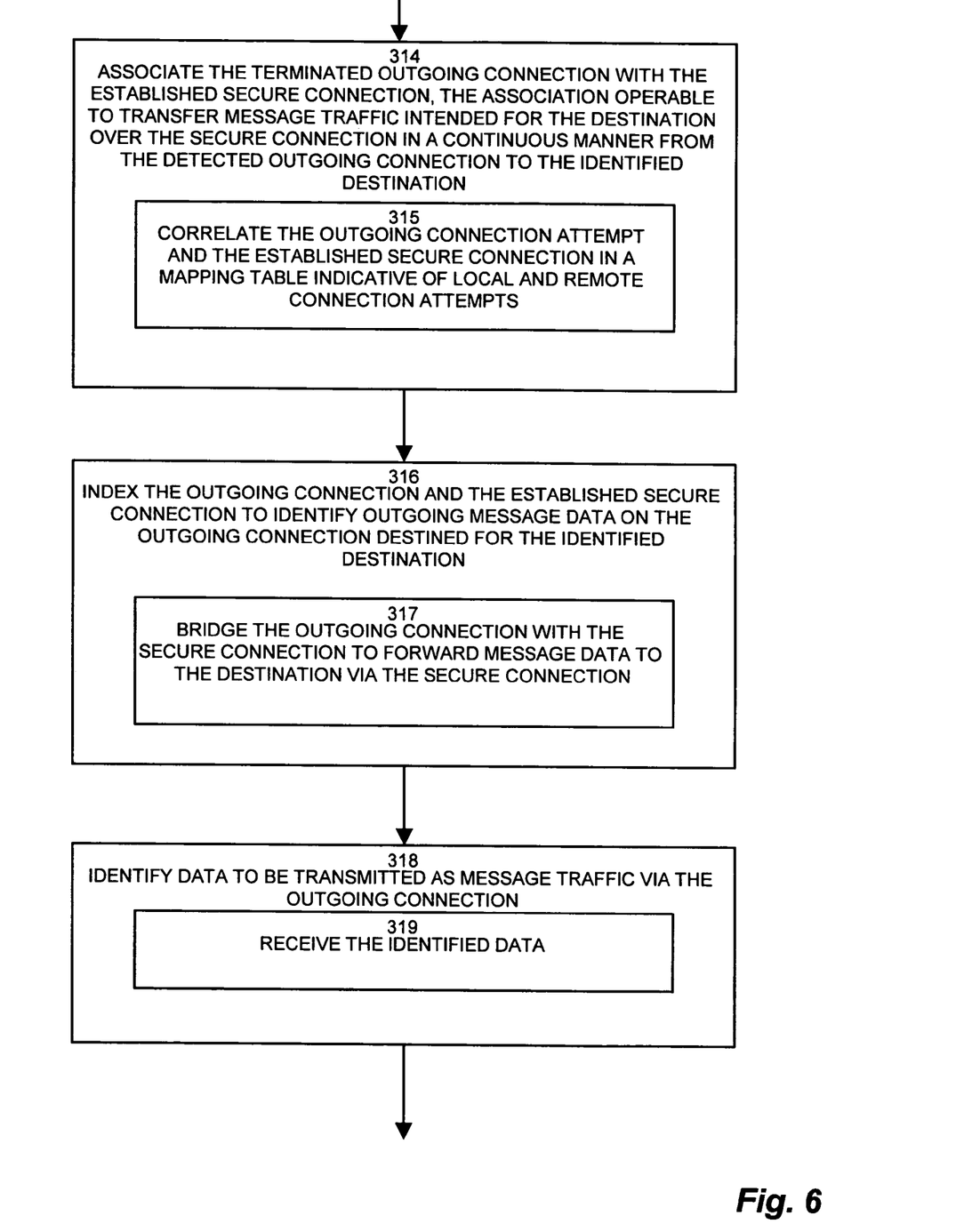
Figure 7:
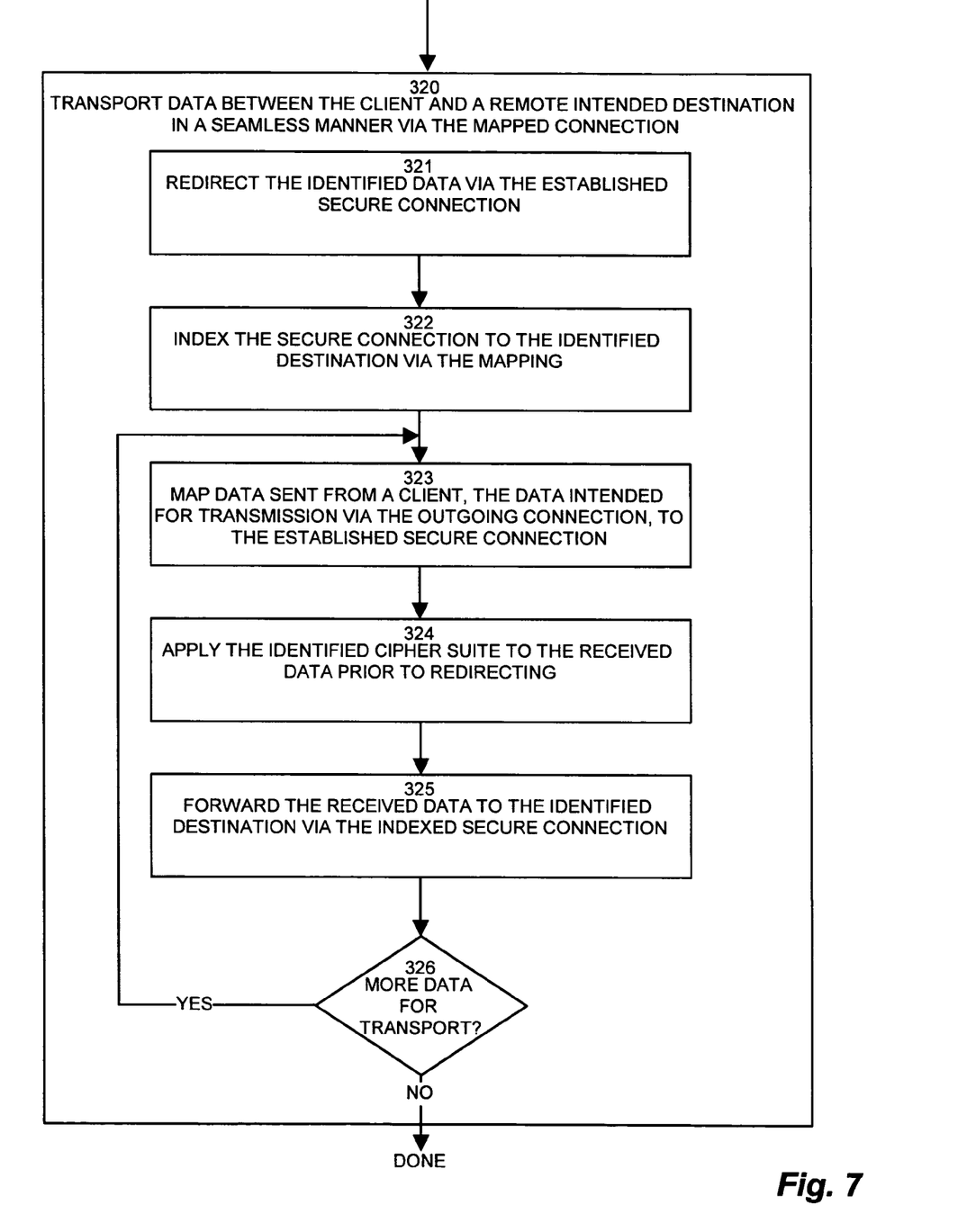

FIG. 3 is a block diagram of the gateway device 120 including the terminator 122 of FIG. 1 in greater detail. Referring to FIGS. 3 and 1, the terminator 112, in the particular exemplary configuration in FIG. 3, takes the form of an SSL terminator 122. The SSL terminator 122 includes a mapper 124 having a mapping table 128, a connection scanner 126, and operates as a secure endpoint 130 for the associated connection 160. In an exemplary arrangement, the client 110 originates the connection 162, from endpoint 132-1 to endpoint 132-2, shown as a first connection by dotted line 152, to the secure endpoint 130.

The SSL terminator 122 initiates a second connection 166, 168, shown by dotted line 154, from endpoints 134-1 to 134-2 at a remote secure endpoint 138. It should be noted that the notation 166, 168 denoting an Internet 140 supported link is labeled for clarity to indicate a suitable switching mechanism provided by the Internet 140, and does not necessarily require or imply additional connections or discontinuous activity on the second connection 166, 168. The mapper 124 stores the association of the connections 152 and 154 in the mapping table 128 to allow corresponding message traffic to map to the corresponding connection 162 or 166, depending on traffic flow direction. Connection information concerning the associations in the table 128 is stored in the scanning criteria 136, to allow subsequent message traffic (i.e. frames or packets) to be identified and mapped to the corresponding connection 162 or 166 via the associations. Further, it should be noted that, in particular configuration, if the remote destination 150 is unable to employ the secure endpoint 138, such as by failing to be configured to support HTTPS encryption, the second connection indicated by dotted line 154 simply reverts to a standard HTTP connection to allow the communication to complete.

FIGS. 4-7 are a flowchart of transparent encryption as in FIG. 2 in greater detail. Referring to FIGS. 1 and 3-7, the SSL terminator 122 intercepts an outgoing connection attempt 114, as depicted at step 300. The SSL terminator 122 is an exemplary configuration of the terminator 112 operating with SSL connections in the gateway device 120 for terminating plaintext, or unencrypted connections and initiating a secure SSL connection, or ciphertext connection. The connection scanner 126 detects the outgoing connection attempt by examining outgoing requests 114 for connection attempts, as shown at step 302. In the exemplary Internet 140 arrangement, the connection sequence is typified by a Syn/Ack exchange, or handshaking of the TCP/IP protocol, as is known in the art. Further, in a typical Internet exchange employed for requesting a remote webpage, the Hypertext Transfer Protocol (HTTP) is employed which uses well known port 80. However, alternate protocols and exchanges may be supported by identifying the corresponding connection or setup sequence.

In a typical scenario employing the system of the invention, the gateway device 120 operates as a common access point from a trusted or secure site, such as an internal corporate LAN or intranet, to an untrusted public access realm such as the Internet 140. In such a scenario, message traffic internal to the LAN need not be encrypted, however it may be desirable or mandatory to encrypt all outgoing message traffic. Typically, such traffic is identifiable by scanning for connection requests to port 80, as outlined above. Alternatively, the connection scanner 126 may be operative to intercept other outgoing communications, such as initiating secure connections for all outgoing requests, or only for selected requests.

Conventional security mechanisms may attempt to establish end-to-end encrypted connections between the client 110 and the remote destination 150, as indicated above. However, at the time of the connection attempt to the remote destination 150 from the SSL terminator 122, the remote destination 150 may not be known or determinable. For example, if the client 110 attempted to establish a point-to-point encrypted connection to the remote destination 150, the destination information itself is obscured by the encryption when the connection attempt 114 reaches the SSL terminator 122. Therefore, the SSL terminator 122 attempts to terminate the connection at the secure endpoint 130, specifying endpoint 132-2 as a first connection, and associate a new secure connection from endpoint 134-1. Accordingly, the connection scanner 126 scans the connection attempt 114 for a destination identifier indicative of the remote intended destination 150, as depicted at step 303. The connection scanner 126 therefore identifies a destination 150 from the outgoing connection attempt 114 by scanning the connection attempt and extracting an identifier indicative of the intended destination, such as an IP address, or other suitable token, as shown at step 304.

The mapper 124 then determines if the outgoing connection 154 is intended as a secure connection, as depicted at step 305. Certain destinations 150 may not be equipped for SSL or other encrypted communication, or alternatively, the mapping table 128 may indicate selective encryption, rather then encrypting all traffic. A check is performed, at step 306, to determine if the mapping table 128 indicates secure (i.e. encrypted) transport. If so, then the mapper 124 identifies a ciphersuite, corresponding to the identified destination 150, indicative of an encryption algorithm operable via the secure connection 154, as shown at step 307. The mapper 124 indexes the identified ciphersuite using the intended destination 150 by indexing the repository 138 of expected destinations to retrieve the ciphersuite data from ciphersuite storage 170, as depicted at step 308. The ciphersuite storage 170, such as a file or table, includes ciphersuite information, such as encryption mechanism type (e.g. RSA, DES, DESIII, as are known in the art), number of bits, certificates and CAs, and other relevant parameters. The SSL terminator 122 then establishes the secure connection 154 using the identified destination 150 from the connection attempt 114, which specifies the endpoints 134-1 and 134-2, the establishing the second connection 154.

If the check at step 306 indicates that no secure connection is expected or feasible, then the SSL terminator 122 establishes a plaintext connection or link to the destination, as shown at step 310. Such a plaintext (unsecure) connection may be applicable if the remote destination 150 is not configured for SSL connections to accept an HTTPS incoming connection request, or if the remote destination cannot be authenticated for the encryption keys employed, for example. In either case, the SSL terminator 122 establishes the attempted outgoing connection 152 by terminating the outgoing connection attempt 114, as shown at step 311, by accepting the outgoing connection attempt as a local connection at the secure endpoint 130 and completing the connection exchange for the local connection 152, via the link 162, as depicted at step 312. The SSL terminator 122 therefore emulates the intended destination 150 as an endpoint 132-2 of the outgoing connection 152 from the client endpoint 132-1, as shown at step 313, establishing a first connection 152.

The SSL terminator then associates the terminated outgoing connection 152 with the established secure connection 154, in which the association is operable to transfer message traffic intended for the destination 150 over the secure connection 154 in a continuous manner from the detected outgoing connection 152 to the identified destination 150, as shown at step 314. The mapper 124 correlates the outgoing connection 152 and the established secure connection 154 in the mapping table 128 indicative of local and remote connection attempts, as shown at step 315. The mapping table 128, in the exemplary arrangement, enumerates the associations between the outgoing connections 152, or first connections, and secure connections 154, or second connections, such that the mapper 124 maps message traffic over the connections 152, 154 to the corresponding counterpart. Therefore, the mapping table 128 indexes the outgoing connection 152 and the established secure connection 154 to identify outgoing message data on the outgoing connection 152 destined for the identified destination 150, as depicted at step 316. The indexed associations in the mapping table 128 therefore associate the outgoing connection 152 with the secure connection 154 to forward message data to the destination 150 via the secure connection 154, as disclosed at step 317.

Following indexing the association in the mapping table 128, the client 110 sends successive message as packets or frames via the local connection 152, and the connection scanner 126 identifies data to be transmitted as message traffic via the secure connection 154, as shown at step 318. The SSL terminator 122 receives the identified data, as depicted at step 319 and transports the data between the client 110 and the remote intended destination 150 in a seamless manner via the mapped connection 160, as shown at step 320. The SSL terminator 122 redirects the received data via the established secure connection 154, as shown at step 321, by indexing the secure connection 154 to the identified destination 150 via the mapping table 128, as depicted at step 322. Using the mapping table 128, the mapper 124 performs a lookup or other suitable indexing (i.e. via hashing) to identify the associated connection 154. Lookup is performed using any suitable field, such as the URL, destination address, port ID, originator/client, or combination, which the connection scanner 126 parses from the message traffic.

For each message packet or other transport portion (e.g. frame, cell, etc.), the mapper 124 maps data sent from the client 110, in which the data is intended for transmission via the outgoing connection 152, to the established secure connection 154, as shown at step 323. The SSL terminator 122 applies the identified ciphersuite from step 308 (if applicable) to the received data prior to redirecting, as shown at step 324, and forwards the received data to the identified destination 150 via the indexed secure connection 154, as depicted at step 325. The identified ciphersuite may be, for example, indicative of stronger or weaker encryption algorithms based on the destination, or of alternate mechanisms for encryption. The ciphersuite may also be indicative of a certificate authority, LDAP certificate reference, or other parameters employable by the SSL transmission. The SSL terminator 122 performs a check, at step 326, to determine if additional packets remain for transport over the associated connection 160, and control reverts to step 323 accordingly.

Those skilled in the art should readily appreciate that the programs and methods for transparent encryption as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for transparent encryption has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for secure transport in a network gateway between an internal client and an external server comprising:
   intercepting an outgoing connection;
   identifying a destination name from the outgoing connection;
   performing a lookup of a destination address at a network gateway, based at least in part on, the destination name;
   establishing secure connection with a destination server using the destination address;
   associating the outgoing connection with the secure connection to produce an association, the association being operable to transfer message traffic over the secure connection in a continuous manner from the outgoing connection to the destination server;
   accepting the outgoing connection as a local connection completing a connection exchange;
   emulating the destination as an endpoint of the outstanding connection;
   identifying data to be transmitted as message traffic via the outgoing connection;
   receiving the identified data; and
   redirecting the identified data via the secure connection;
   mapping data sent from a client to the secure connection where the data is intended from transmission via the outgoing connection;
   scanning the outgoing connection and extracting a destination hostname;
   receiving data over the local connection;
   mapping the secure connection to the destination name using an index;
   forwarding the received data to the destination server based on the index;
   identifying a ciphersuite corresponding to the destination name where the ciphersuite is indicative of an encryption algorithm operable via the secure connection; and
   applying the ciphersuite to the received data associated with the outgoing connection prior to red redirecting.

2. The method of claim 1 where the destination address is an IP address; and
   performing a lookup of a destination address at a network gateway includes sending a request to a Domain Name System (DNS) server.

3. The method of claim 1
   where the outgoing connection is a Hypertext Transfer Protocol (HTTP) connection; and
   the secure connection is a Hypertext Transfer Protocol over Secure Socket Layer (HTTPS) connection.

4. The method of claim 1 further comprising:
   determining if the outgoing connection is intended as a secure connection; and
   indexing a ciphersuite using the intended destination by indexing a repository of expected destinations.

5. The method of claim 1 where mapping the secure connection to the destination name in the index is performed using hash.

6. A data communication vice for secure transport comprising:
   an SSL terminator operable to intercept en outgoing connection attempt;
   a connection scanner operable to identify a destination from the intercepted outgoing connection attempt;
   a secure endpoint responsive to the SSL terminator to establish a secure connection using the identified destination from the connection attempt, the SSL terminator further operable to establish the attempted outgoing connection by terminating the outgoing connection attempt; and a mapper operable to associate the terminated outgoing connection with the established secure connection, the association operable to transfer message traffic intended for the destination over the secure connection in a continuous manner from the intercepted outgoing connection to the identified destination;

where the SSL terminator is operable to:

accept the outgoing connection attempt as a local connection by completing a connection exchange to terminate and complete the outgoing connection attempt; and emulate the intended destination as an endpoint of the outgoing connection;

identify data to be transmitted as message traffic via the outgoing connection;

receive the identified data; and redirect the identified data via the established secure connection;

where the mapper is operable to map data sent from a client, in which the data is intended for transmission via the outgoing connection, to the established secure connection;

where the connection scanner is operable to identify the destination by scanning the connection attempt; and extracting an identifier indicative of the intended destination;

where the SSL terminator is operable to transport data between the client and a remote intended destination in a seamless manner via the mapped connection, the SSL terminator further operable to:

receive data over the established local connection;

index the secure connection to the identified destination via the mapping; and forward the received data to the identified destination via the indexed secure connection;

a repository operable to store a ciphersuite, the SSL terminator further operable to:

identify the ciphersuite corresponding to the identified destination and indicative of an encryption algorithm operable via the secure connection; and apply the identified ciphersuite to the received data prior to redirecting;

where the connection scanner is further operable to:

detect an outgoing connection attempt; and scan the connection ettempt for a destination identifier indicative of a remote intended recipient.

7. The data communication device of claim 6 wherein the SSL terminator is further operable to:

correlate the outgoing connection attempt and the established secure connection in a mapping table indicative of local and remote connection attempts;

index, in the mapping table, the outgoing connection and the established secure connection to identify outgoing message data on the outgoing connection destined for the identified destination; and associate the outgoing connection with a proxy link to the secure connection to forward message data to the destination via the secure connection.

8. The data communication device of claim 7 wherein the SSL terminator is further operable to determine, via the mapping, if the outgoing connection is intended as a secure connection; and if so index a ciphersuite using the intended destination by indexing a repository of expected destinations: and if not, to revert to establishing a plaintext connection to the remote destination.

* * * * *